(12) United States Patent
Boulay et al.

(10) Patent No.: US 11,794,542 B2
(45) Date of Patent: Oct. 24, 2023

(54) SHOCK ABSORBER WITH METAL DAMPER TUBE AND COMPOSITE MOUNTING ATTACHMENT AND SPRING SEAT

(71) Applicant: DRiV Automotive Inc., Southfield, MI (US)

(72) Inventors: Emilie Boulay, Cortil-Wodon (BE); Miguel Dhaens, Lommel (BE)

(73) Assignee: DRiV Automotive Inc., Northville, MI (US)

( * ) Notice: Subject to any disclaimer, the term of this patent is extended or adjusted under 35 U.S.C. 154(b) by 149 days.

(21) Appl. No.: 17/194,725

(22) Filed: Mar. 8, 2021

(65) Prior Publication Data
US 2022/0281278 A1 Sep. 8, 2022

(51) Int. Cl.
*B60G 13/08* (2006.01)
*F16F 9/54* (2006.01)
(Continued)

(52) U.S. Cl.
CPC ............ *B60G 13/08* (2013.01); *F16F 9/19* (2013.01); *F16F 9/3235* (2013.01); *F16F 9/42* (2013.01);
(Continued)

(58) Field of Classification Search
CPC ........ F16F 9/19; F16F 9/54; F16F 9/42; F16F 9/3235; F16F 2222/12; F16F 2224/02;
(Continued)

(56) References Cited

U.S. PATENT DOCUMENTS

| | | | | |
|---|---|---|---|---|
| 2,493,037 A | * | 1/1950 | Simon | B62K 19/08 29/463 |
| 5,078,417 A | * | 1/1992 | Mouritsen | B62K 21/02 264/258 |

(Continued)

FOREIGN PATENT DOCUMENTS

| | | |
|---|---|---|
| DE | 4232136 A1 | 3/1994 |
| DE | 10320002 A1 | 11/2004 |

(Continued)

OTHER PUBLICATIONS

International Search Report and Written Opinion regarding International Patent Application No. PCT/US2022/018092, dated Jun. 9, 2022.

*Primary Examiner* — Robert A. Siconolfi
*Assistant Examiner* — James K Hsiao
(74) *Attorney, Agent, or Firm* — Harness, Dickey & Pierce, P.L.C.

(57) ABSTRACT

A shock absorber having a metal damper tube and base assembly is provided. The base assembly, which includes a composite mounting attachment made of a composite material, such as a recyclable thermoplastic, is fixed to an external surface of the metal damper tube, which may be a finished product. A cavity in the composite mounting attachment houses at least a portion of the metal damper tube and thus defines an overlapping region where the composite mounting attachment and the metal damper tube are co-extensive with each other. One or more windows are provided in the overlapping region of the composite mounting attachment where the metal damper tube is left exposed. This helps to promote heat dissipation away from the metal damper tube while reducing weight and heat transmission from the metal damper tube to the composite mounting attachment to reduce overheating of the composite material.

20 Claims, 6 Drawing Sheets

(51) Int. Cl.
*F16F 9/42* (2006.01)
*F16F 9/19* (2006.01)
*F16F 9/32* (2006.01)

(52) U.S. Cl.
CPC ............ *F16F 9/54* (2013.01); *B60G 2202/24* (2013.01); *B60G 2204/129* (2013.01); *B60G 2206/41* (2013.01); *B60G 2206/70* (2013.01); *B60G 2206/72* (2013.01); *B60G 2206/821* (2013.01); *B60G 2600/72* (2013.01); *B60G 2800/162* (2013.01); *F16F 2222/12* (2013.01); *F16F 2224/02* (2013.01); *F16F 2224/0208* (2013.01); *F16F 2226/042* (2013.01); *F16F 2230/0005* (2013.01); *F16F 2232/08* (2013.01); *F16F 2234/02* (2013.01)

(58) Field of Classification Search
CPC ......... F16F 2224/0208; F16F 2226/042; F16F 2230/0005; F16F 2232/08; F16F 2234/02; F16F 9/3242; B60G 13/08; B60G 2202/24; B60G 2206/41; B60G 2204/129; B60G 2206/70; B60G 2206/72; B60G 2800/162; B60G 2206/7101; B60G 2206/7104
See application file for complete search history.

(56) References Cited

U.S. PATENT DOCUMENTS

| | | | | |
|---|---|---|---|---|
| 5,181,732 | A * | 1/1993 | Bezin | B62K 19/16 280/281.1 |
| 5,248,159 | A * | 9/1993 | Moore | B62K 25/08 267/202 |
| 5,456,481 | A * | 10/1995 | Allsop | B29C 45/006 280/281.1 |
| 5,580,075 | A * | 12/1996 | Turner | F16F 9/50 267/141.1 |
| 6,955,372 | B1 * | 10/2005 | Fritschen | B62K 19/00 280/281.1 |
| 7,004,293 | B2 | 2/2006 | Schurmans | |
| 7,637,128 | B2 * | 12/2009 | Kim | F16F 9/3235 188/322.18 |
| 8,245,403 | B2 * | 8/2012 | Yu | B62K 25/08 280/281.1 |
| 8,430,416 | B2 * | 4/2013 | Battlogg | B62K 25/04 188/267.2 |
| 8,434,772 | B2 * | 5/2013 | Keil | F16F 9/3235 188/315 |
| 9,649,905 | B2 | 5/2017 | Hernette et al. | |
| 9,718,322 | B2 * | 8/2017 | Wilkin | B60G 13/08 |
| 9,739,330 | B2 | 8/2017 | Reybrouck et al. | |
| 10,006,516 | B2 | 6/2018 | Wilkin | |
| 2003/0110880 | A1 * | 6/2003 | Tison | B62K 21/06 74/551.8 |
| 2003/0168296 | A1 | 9/2003 | Fullenkamp et al. | |
| 2004/0007848 | A1 * | 1/2004 | Sinyard | B62K 21/02 280/279 |
| 2008/0029993 | A1 * | 2/2008 | Callahan | B62K 21/06 280/280 |
| 2008/0303240 | A1 * | 12/2008 | Lewis | B62K 21/04 280/276 |
| 2009/0064724 | A1 * | 3/2009 | Kim | F16F 9/3235 68/23.1 |
| 2010/0230877 | A1 * | 9/2010 | Schudt | F16F 1/377 267/195 |
| 2011/0056785 | A1 * | 3/2011 | Marquar | B60G 15/07 156/283 |
| 2011/0259688 | A1 * | 10/2011 | Kanioz | F16F 7/09 188/381 |
| 2012/0104725 | A1 * | 5/2012 | Yu | B62K 21/04 280/281.1 |
| 2013/0175778 | A1 | 7/2013 | Pilastre | |
| 2014/0366718 | A1 | 12/2014 | Kanioz | |
| 2016/0031282 | A1 * | 2/2016 | Hernette | F16F 13/007 280/124.125 |
| 2016/0137017 | A1 * | 5/2016 | Wilkin | B60G 15/062 267/221 |
| 2016/0146285 | A1 | 5/2016 | Wilkin | |
| 2016/0208881 | A1 * | 7/2016 | Kanioz | F16F 7/09 |
| 2016/0229247 | A1 * | 8/2016 | Kuroda | B60G 7/005 |
| 2017/0021888 | A1 * | 1/2017 | Hastie | B62K 3/06 |
| 2017/0274718 | A1 * | 9/2017 | Allegre | F16F 9/54 |
| 2017/0274719 | A1 * | 9/2017 | Broeckx | B60G 15/063 |
| 2019/0153178 | A1 * | 5/2019 | Hochstetter | B29C 70/06 |
| 2019/0185102 | A1 * | 6/2019 | De La Corte | B62K 21/02 |

FOREIGN PATENT DOCUMENTS

| | | |
|---|---|---|
| DE | 102006062414 A1 | 6/2008 |
| DE | 102007053120 A1 | 5/2009 |
| DE | 102010040142 A1 | 4/2011 |
| DE | 102011087597 A1 | 12/2011 |
| DE | 102011076200 A1 | 11/2012 |
| DE | 102014007961 A1 | 6/2014 |
| DE | 102013004950 A1 | 9/2014 |
| DE | 102013108251 A1 | 10/2014 |
| DE | 102014213712 A1 | 1/2016 |
| EP | 0027163 A1 | 4/1981 |
| EP | 3142843 B1 | 4/2018 |
| FR | 3002187 A1 | 8/2014 |
| JP | 5822354 B2 | 11/2015 |
| KR | 10-2006-0058757 A | 5/2006 |
| KR | 10-2007-0062700 A | 6/2007 |
| KR | 101313891 B1 | 10/2013 |
| WO | WO-2005030506 A2 | 4/2005 |
| WO | WO-2013017638 A1 | 2/2013 |
| WO | WO-2015018601 A1 | 2/2015 |
| WO | WO-2015172994 A1 | 11/2015 |
| WO | WO-2020115388 A1 | 6/2020 |

* cited by examiner

SHOCK ABSORBER WITH METAL DAMPER TUBE AND COMPOSITE MOUNTING ATTACHMENT AND SPRING SEAT

FIELD

The present disclosure relates generally to shock absorbers for vehicle suspension systems and more particularly to shock absorbers that are made using a combination of metal and thermoplastic materials.

BACKGROUND

The statements in this section merely provide background information related to the present disclosure and may not constitute prior art.

In general, shock absorbers (i.e., dampers) are used to absorb and dissipate the impact and rebound movement of a vehicle's suspension system and keep the vehicle's tires in contact with the ground. Shock absorbers are typically installed alongside a spring (as a stand-alone shock absorber) or inside a spring (as part of a coil-over shock and strut assembly) and placed in front and rear suspension systems. Each shock absorber is attached to a frame member or other sprung component of the vehicle by an upper mount and is attached to a suspension member or other unsprung component of the suspension by a lower mount.

Conventional hydraulic shock absorbers include a metal pressure tube, which acts as a hydraulic cylinder. A piston is slidably disposed within the metal pressure tube with the piston separating the interior of the metal pressure tube into two fluid chambers. A piston rod is connected to the piston and extends out of one end of the metal pressure tube where it is adapted for attachment to a sprung or unsprung component of the vehicle. The opposite end of the metal pressure tube is adapted for attachment to the other sprung or unsprung component of the vehicle. In a mono-tube shock absorber, the pressure tube may be the outermost tube of the shock absorber. By contrast, in a dual-tube shock absorber, the metal pressure tube is typically positioned concentrically within a metal reserve tube, which is the outermost tube of the shock absorber. One or more valving systems are typically incorporated within the piston itself or in a base valve assembly, which function to create a damping load during the damper's extension (i.e., rebound) and compression strokes.

In recent times, the automotive industry and related segments have increasingly placed more and more emphasis on weight reduction where metal components, such as those made of steel or aluminum, cannot answer anymore. This demand for weight saving products encompasses suspension components, including shock absorbers with reduced weight over their traditional steel counterparts. However, while materials with lower density and weight, like fiber-reinforced plastics, show promising specific strength and stiffness characteristics (e.g., ratio strength and stiffness/density), there are challenges with the use of such materials in shock absorbers because such materials typically do not meet all of the same requirements as steel (e.g., qua strength, stiffness, and durability). As such, a pure composite solution may not meet industry expectations for shock absorbers due to environment sensitivity, ageing behaviour, lower conductivity leading to poor heat dissipation in the shock absorber, differences in thermal dilation with other structures, poor tolerances leading to tightness issues and noises, and/or accelerated fatigue.

SUMMARY

This section provides a general summary of the disclosure, and is not a comprehensive disclosure of its full scope or all of its features.

In accordance with one aspect of the present disclosure, a shock absorber having a metal damper tube and base assembly is provided. The metal damper tube extends co-axially about a longitudinal axis and longitudinally between a first damper tube end and a second damper tube end. The metal damper tube has both an internal surface and an external surface, between which a thickness of the metal damper tube is defined. The base assembly, which includes composite mounting attachment made of a composite material, is fixed to the external surface of the metal damper tube. The composite mounting attachment has a cavity that houses at least a portion of the metal damper tube to define an overlapping region where the composite mounting attachment and the metal damper tube are co-extensive (i.e., overlap) with each other.

One or more windows are provided in the overlapping region of the composite mounting attachment where the metal damper tube is left exposed and uncovered by the composite material of the composite mounting attachment. This helps to promote heat dissipation away from the metal damper tube while reducing heat transmission from the metal damper tube to the composite mounting attachment.

In accordance with another aspect of the subject disclosure, the composite mounting attachment is made of a thermoplastic, a recyclable thermoplastic, and/or a fiber reinforced thermoplastic material and includes first and second stanchion that extend longitudinally from the overlapping region of the composite mounting attachment to a distal end of the composite mounting attachment, while the cavity that houses at least a portion of the metal damper tube is located at a proximal end of the composite mounting attachment. The first and second stanchions extend in substantially parallel directions relative to each other on opposite sides of the longitudinal axis and are spaced apart by a transverse gap. The first and second stanchions include first and second bores, respectively, that are positioned at the distal end of the composite mounting attachment and that cooperate to form a fastener bore that extends perpendicularly relative to the longitudinal axis. The fastener bore is geometrically configured (i.e., sized) to receive a fastener for coupling the distal end of the composite mounting attachment to a sprung or unsprung component of the vehicle.

Advantageously, the hybrid, composite and metal shock absorber of the present disclosure reduces weight while maintaining high strength and durability characteristics. In addition, the internal components (e.g., piston, valves, and piston rod) can be assembled, installed, and the metal damper tube can be closed prior to overmolding the composite mounting attachment for improved manufacturing efficiencies and the composite mounting attachment can allow for the thickness of the metal damper tube to be reduced compared to traditional all-metal shock absorbers, both of which can provide cost-savings.

During operation of the shock absorber, heat is generated within the metal damper tube as hydraulic fluid flows through the various valve orifices during the compression and extension strokes of the shock absorber. The metal damper tube has a much higher thermal conductivity than the composite material of the composite mounting attachment. The window(s) in the overlapping region of the composite mounting attachment therefore help reduce the internal temperature of the shock absorber during operation by providing a larger exposed surface area of the metal damper tube to dissipate heat. More importantly, the structural integrity, durability, and strength of the composite material of the mounting yoke can be compromised if the composite material becomes overheated during operation of the shock absorber. So while the window(s) in the overlapping region of the composite mounting attachment help reduce the operating temperature of the shock absorber, more importantly the window(s) also reduce the amount of heat that is transmitted from the metal damper tube to the composite mounting attachment to reduce overheating of the composite material. Ultimately, this improves the durability and service life of the composite mounting attachment.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
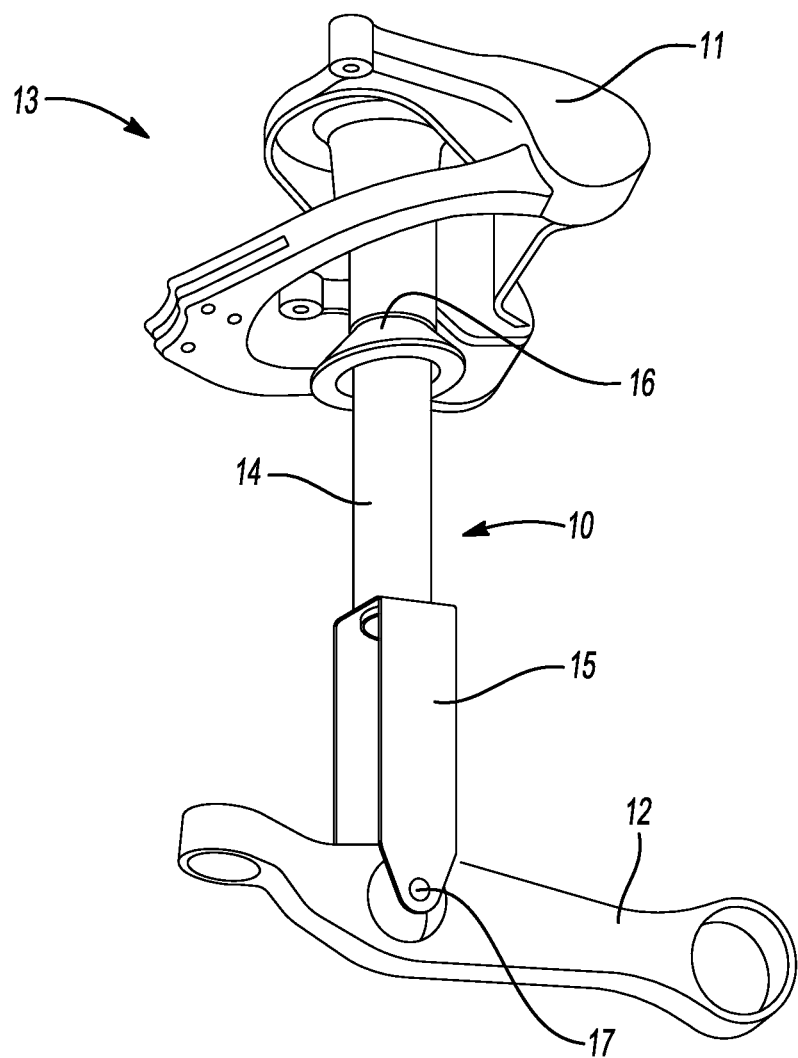
FIG. 1 is a side perspective view of an exemplary prior art shock absorber shown mounted to upper and lower mounts of a vehicle suspension system.
Figure 2:
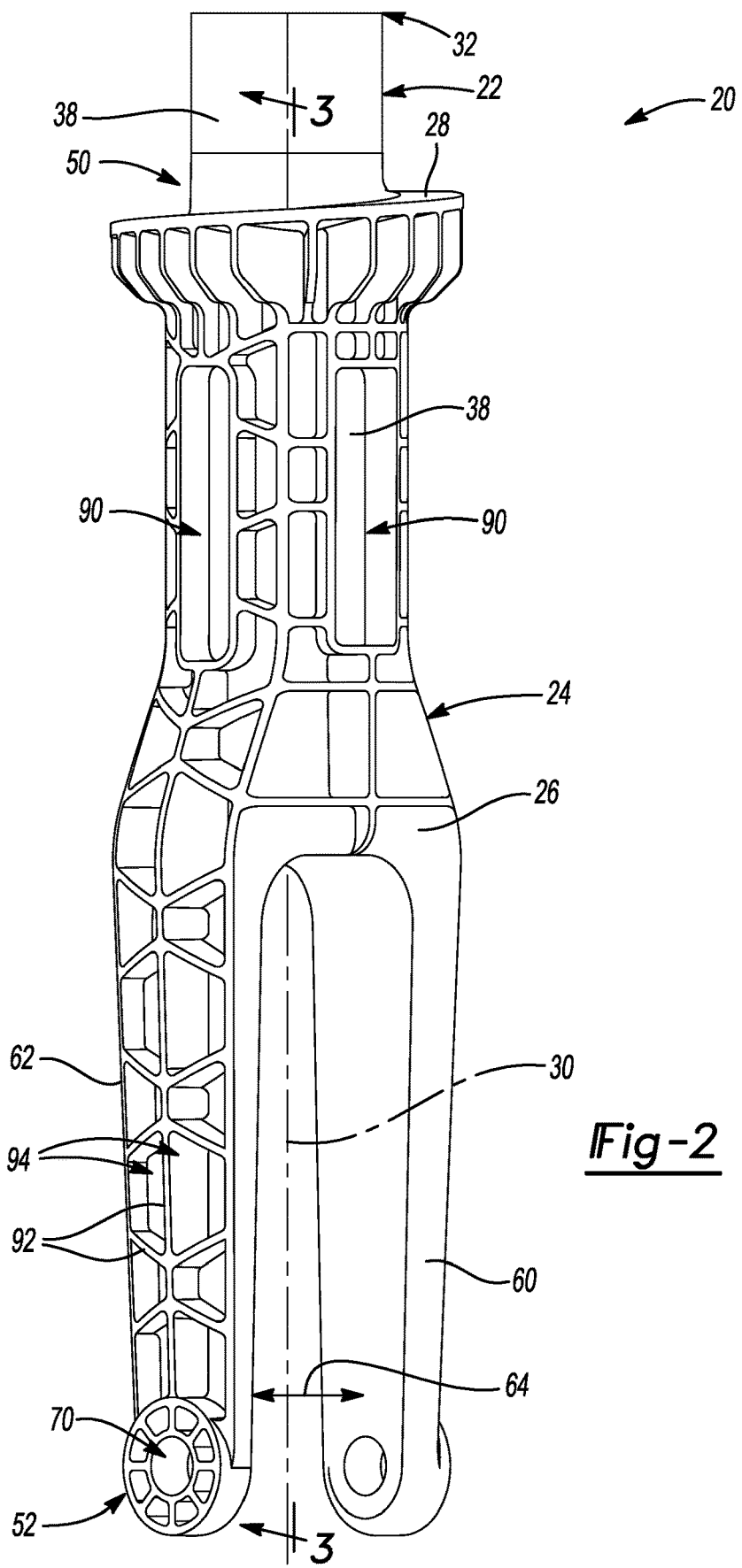
FIG. 2 is a side perspective view of an exemplary shock absorber that has been constructed according to the teachings of the present disclosure.

Referring to the Figures, wherein like numerals indicate corresponding parts throughout the several views, a shock absorber 20 is illustrated.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a traditional shock absorber 10 is shown mounted to an upper mount 11 and a lower mount 12 of an exemplary vehicle suspension system 13. In the illustrated example, the shock absorber 10 includes a metal damper tube 14 that includes a metal yoke 15 at one end and a metal spring seat 16 mounted near the other end. Both the metal yoke 15 and the metal spring seat 16 are separate metal parts that are fixed (e.g., welded or press-fit) onto the metal damper tube 14. In the illustrated example, the lower mount 12 is provided in the form of a swing arm, which is configured to be pivotally coupled to a wheel knuckle and the vehicle frame (not shown), and is an unsprung component the vehicle suspension system 13. The metal yoke 15 of the shock absorber 10 is pivotally coupled to the lower mount 12 by a fastener 17. In the illustrated example, the upper mount 11 is configured to be mounted to the vehicle body (not shown). When the vehicle suspension system 13 is fully assembled, a coil spring (not shown) is mounted co-axially about the shock absorber 10 between the upper mount 11 and the metal spring seat 16.

Although other configurations are possible, is some examples, a piston rod may extends out from the metal damper tube 14 at the end adjacent to the metal spring seat 16. The piston rod is arranged in sliding engagement with the metal damper tube 14 and is attached to a sprung component of the vehicle suspension. Thus, the piston rod slides up and down relative to the metal damper tube 14 when the shock absorber 10 undergoes extension (i.e., rebound) and compression strokes. During operation of the shock absorber 10, heat is generated within the metal damper tube 14 as hydraulic fluid flows through the various valve orifices during the compression and extension strokes of the shock absorber 10. This generation of heat is a design consideration that must be considered when selecting the materials used in the shock absorber 10.

The shock absorber 20 illustrated in FIGS. 2-6 is constructed in accordance with the present disclosure and is designed to be used in place of the traditional, all-metal shock absorber 10 shown in FIG. 1. Thus, the shock absorber 20 illustrated in FIGS. 2-6 mounts to the upper and lower mounts 11, 12 of the vehicle suspension system 13 shown in FIG. 1 in exactly the same manner. The shock absorber 20 illustrated in FIGS. 2-6 includes a metal damper tube 22 and a base assembly 24 with a composite mounting attachment 26 and integral spring seat 28.

Figure 3:
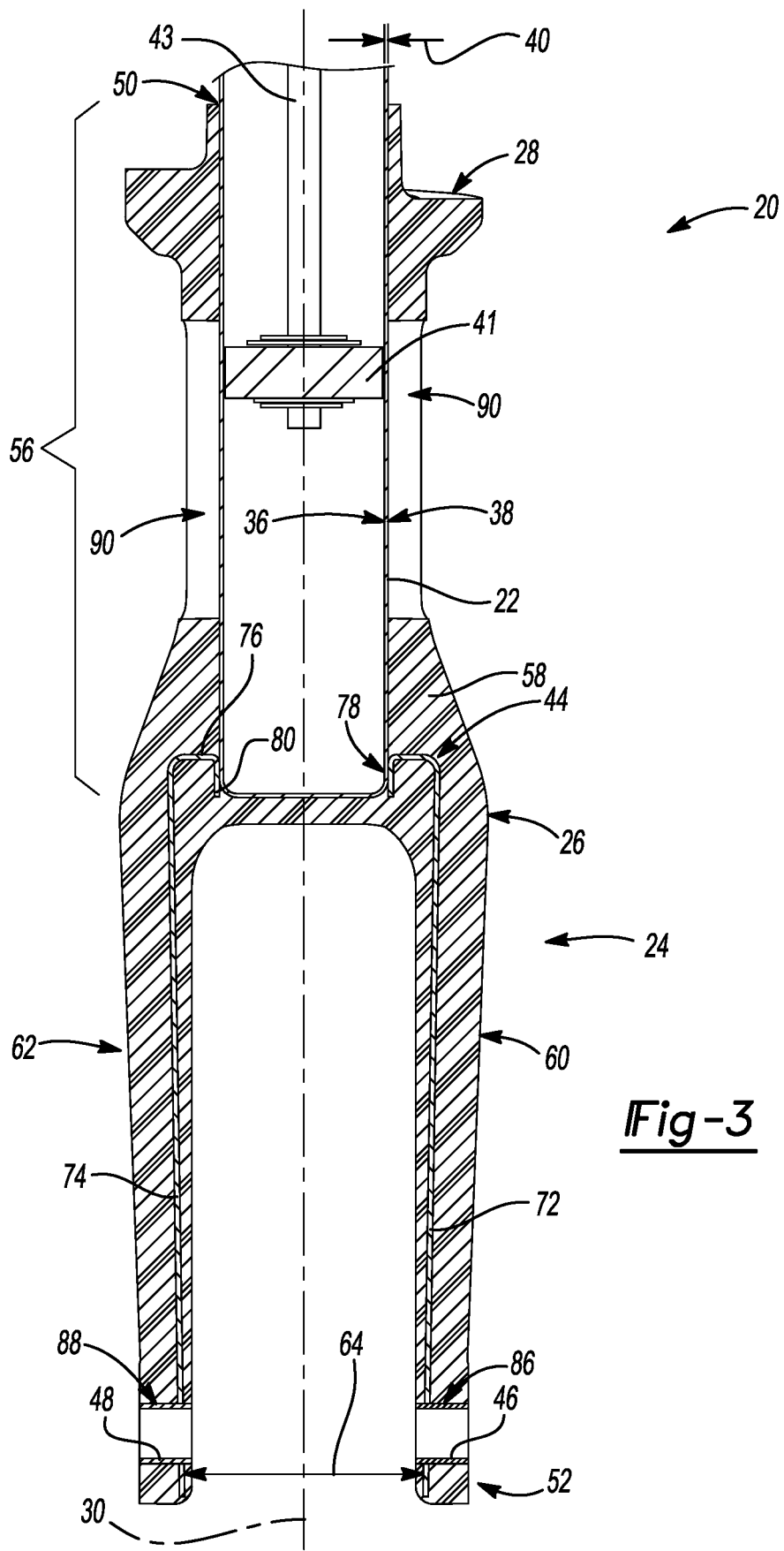
FIG. 3 is a side cross-section view of the exemplary shock absorber illustrated in FIG. 2 taken along line 3-3.

The metal damper tube 22 of the shock absorber 20 illustrated in FIGS. 2-6 extends co-axially about a longitudinal axis 30 and longitudinally between a first damper tube end 32 and a second damper tube end 34. It should be appreciated that when the terms "longitudinal" and "longitudinally" are used herein, they are meant to describe structures, dimensions, directions, or movements that are substantially parallel to the longitudinal axis 30. The metal damper tube 22 has an internal surface 36 and an external surface 38, between which a thickness 40 of the metal damper tube 22 is defined. In the illustrated example, the external surface 38 of the metal damper tube 22 includes a textured area 42 adjacent to the second damper tube end 34. The textured area 42 of the metal damper tube 22 can be formed by a number of different processes. By way of example and without limitation, the textured area 42 may be formed by sanding, sandblasting, etching (e.g., chemical or laser etching), or forming grooves, threads, dimples, cross-hatching, or knurling on the external surface 38 of the metal damper tube 22. As shown in FIG. 3, the shock absorber 20 includes a piston 41 and a piston rod 43. The piston 41 is slideably disposed inside the metal damper tube 22 and may include valving for controlling fluid flow through one or more fluid orifices. The piston rod 43 is fixably coupled to the piston 41, extends co-axially along the longitudinal axis 30, and protrudes out from the first damper tube end 32.

The base assembly 24 of the shock absorber 20 illustrated in FIGS. 2-6 is fixed to the metal damper tube 22 at a location adjacent to the second damper tube end 34 and includes a metal insert 44, a first metal eyelet 46, and a second metal eyelet 48, in addition to the composite mounting attachment 26 and integral spring seat 28. The composite mounting attachment 26 extends longitudinally between a proximal end 50 and a distal end 52. The proximal end 50 of the composite mounting attachment 26 includes a cavity 54 that houses at least a portion of the metal damper tube 22 to define an overlapping region 56 where the composite mounting attachment 26 and the metal damper tube 22 are co-extensive with each other. In the illustrated example, the overlapping region 56 is adjacent to the proximal end 50 of the composite mounting attachment 26 and the second damper tube end 34 and coincides with the textured area 42 on the external surface 38 of the metal damper tube 22. In the illustrated example, the integral spring seat 28 of the shock absorber 20 is also located at the proximal end 50 of the composite mounting attachment 26 and extends radially outward, away from the metal damper tube 22.

The composite mounting attachment 26 is made of a composite material 58 that is bonded to the textured area 42 of the metal damper tube 22. By way of example, the composite material 58 of the composite mounting attachment 26 is a thermoplastic material, such as a recyclable thermoplastic, a fiber reinforced thermoplastic material with a glass fiber content between 20-50 percent, or a thermoplastic material that is not reinforced by fibers. Testing revealed that this particular material selection provided optimal weight savings, dimensional stability, qua strength, durability, and heat dissipation for shock absorber applications specifically. Although other configurations are possible, in the illustrated example, the composite mounting attachment 26 and the integral spring seat 28 are formed as a single piece (i.e., they are provided as one piece). The integral spring seat 28 is also made of the composite material 58. In other words, both the composite mounting attachment 26 and the integral spring seat 28 are made of the same composite material 58.

Although different variations are possible depending on vehicle specific applications and requirements, in the illustrated example, the composite mounting attachment 26 may be configured as a yoke, loop, or bracket. The composite mounting attachment 26 is configured as a yoke in the illustrated example and includes first and second stanchions 60, 62 that extend longitudinally from the overlapping region 56 of the composite mounting attachment 26 to the distal end 52 of the composite mounting attachment 26. The first and second stanchions 60, 62 extend in substantially parallel directions relative to each other on opposite sides of the longitudinal axis 30 and are spaced apart by a transverse gap 64. The first and second stanchions 60, 62 include a first bore 66 and a second bore 68, respectively, that are positioned at the distal end 52 of the composite mounting attachment 26. The first and second bores 66, 68 in the first and second stanchions 60, 62 cooperate to form a fastener bore 70 that extends perpendicularly relative to the longitudinal axis 30. The fastener bore 70 is geometrically configured (i.e., sized) to receive fastener 17 for coupling the distal end 52 of the composite mounting attachment 26 to the lower mount 12 illustrated in FIG. 1, for example.

Figure 4:
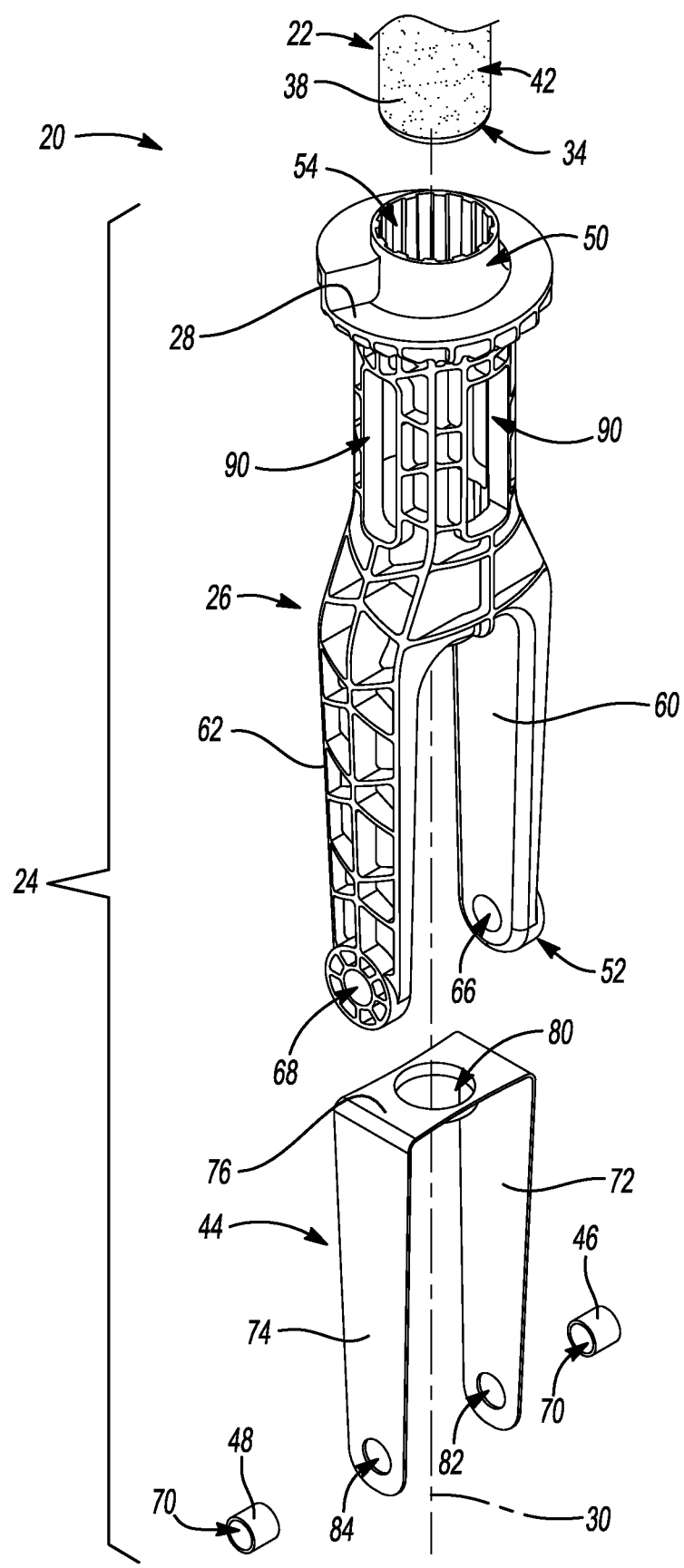
FIG. 4 is an exploded perspective view of the exemplary shock absorber illustrated in FIG. 2.
Figures 5, 6:
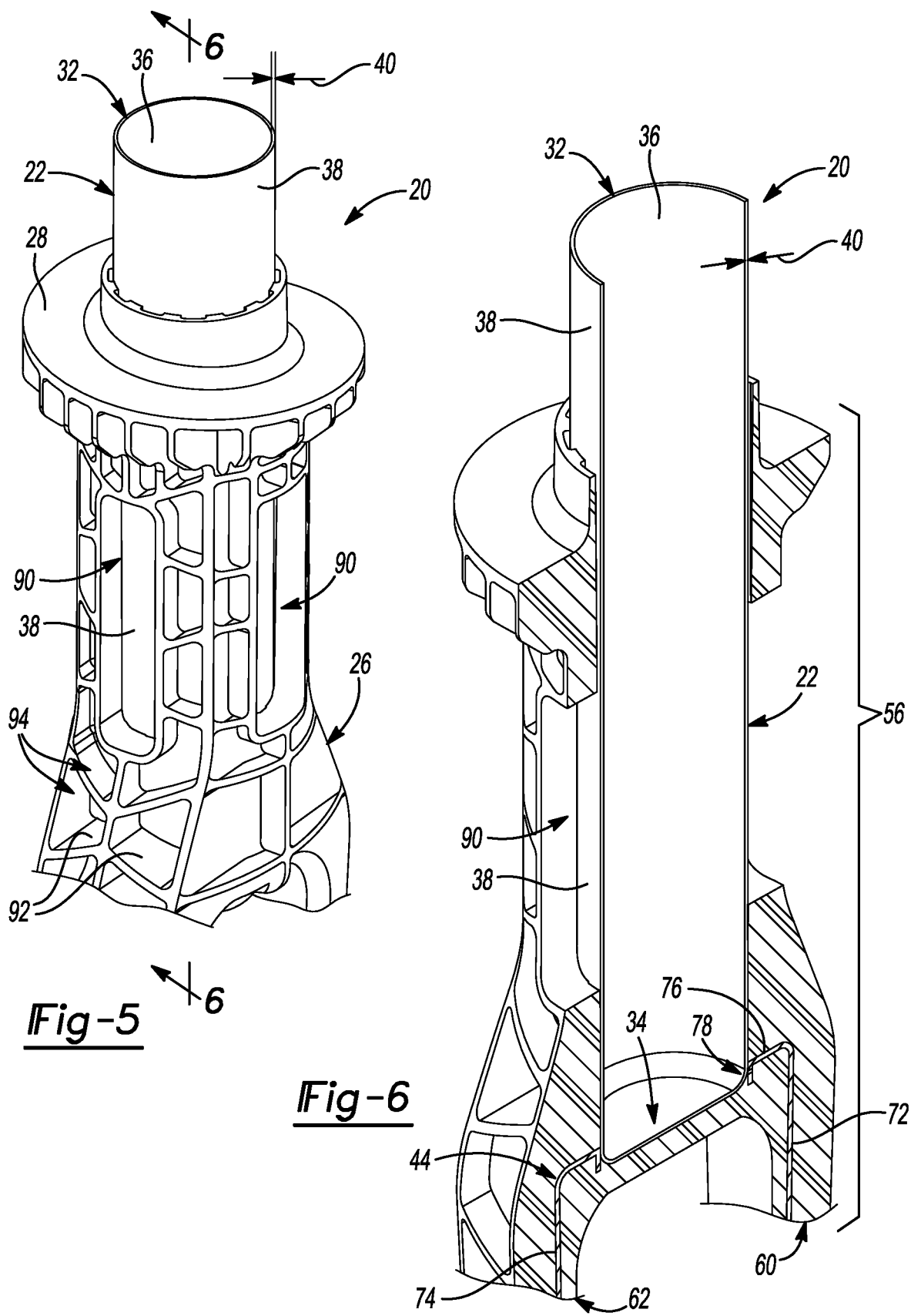
FIG. 5 is an enlarged perspective view of a portion of the exemplary shock absorber illustrated in FIG. 2.
FIG. 6 is a perspective section view of the exemplary shock absorber illustrated in FIG. 5 taken along line 6-6.

As best seen in FIGS. 3 and 4, the metal insert 44 includes a first leg 72 and a second leg 74 that extend longitudinally from a flange 76 that is attached to the second end of the metal damper tube 22 at a fixed flange connection 78. For example and without limitation, the fixed flange connection 78 may include a fluted opening 80 in the flange 76 where the second damper tube end 34 is press-fit into the fluted opening 80 in the flange 76, welded to the flange 76, screwed (i.e., threaded) into the flange 76, or glued to the flange 76. In illustrated example, the second damper tube end 34 is a closed tube end and the composite mounting attachment 26 has a cup-like shape that receives and covers (i.e., encloses) the second damper tube end 34. Alternatively, the second damper tube end 34 may be exposed (i.e., left uncovered by the composite mounting attachment 26 where an opening in the composite mounting attachment 26 that leaves the second damper tube end 34 exposed). Like the first and second stanchions 60, 62 of the composite mounting attachment 26, the first and second legs 72, 74 of the metal insert 44 extend in substantially parallel directions relative to each other on opposite sides of the longitudinal axis 30 and are also spaced apart by the transverse gap 64. The first and second legs 72, 74 also include a first hole 82 and a second hole 84, respectively, that are arranged in alignment with the first and second bores 66, 68 in the first and second stanchions 60, 62. The first and second metal eyelets 46, 48 are positioned and extend through the first and second bores 66, 68 in the first and second stanchions 60, 62 of the composite mounting attachment 26 and the first and second holes 82, 84 in the first and second legs 72, 74 of the metal insert 44. The first and second metal eyelets 46, 48 are attached to the first and second legs 72, 74 of the metal insert 44 at a first fixed connection 86 and a second fixed connection 88. By way of example and without limitation, the first and second fixed connections 86, 88 may be press-fit connections or welded connections between the first and second metal eyelets 46, 48 and the first and second legs 72, 74 of the metal insert 44.

The composite material 58 of the composite mounting attachment 26 is overmolded and covers at least portions of the metal damper tube 22, the metal insert 44, and the first and second metal eyelets 46, 48. More specifically, the composite material 58 may be overmolded over parts of the metal damper tube 22, metal insert 44, and first and second metal eyelets 46, 48 by an injection molding process or a three-dimensional (3D) printing process, for example. As a result, the metal insert 44 may be completely or partially embedded in the composite material 58 forming the composite mounting attachment 26. The internal components (e.g., piston, valves, and piston rod) can be assembled, installed, and the metal damper tube 22 can be closed prior to overmolding the composite mounting attachment 26 for improved manufacturing efficiencies and associated cost savings. For example, the metal damper tube 22 may be assembled in a standardized assembly and then a wide range of different composite mounting attachments and/or integral spring seats can be produced by injection overmolding or by three-dimensionally (3D) printing different composite mounting attachments and/or integral spring seats onto/over the metal damper tube 22 for a variety of different vehicle specific applications without requiring substantial changes to the manufacturing process or tooling. This also can provide cost savings by avoiding several manufacturing steps where the mounting yoke and/or spring seat are assembled and fixed (e.g., welded or press-fit) onto the metal damper tube 22 like in the traditional, all-metal shock absorber illustrated in FIG. 1.

Advantageously, the hybrid, composite and metal shock absorber 20 of the present disclosure reduces weight while maintaining high strength and durability characteristics. Generally speaking, the composite material 58 allows the composite mounting attachment 26 and integral spring seat 28 to be made lighter than their metal (e.g., steel) counterparts. The composite mounting attachment 26 also provides further cost savings and weight reduction because the strength characteristics of the composite material 58 may allow for the thickness 40 of the metal damper tube 22 to be reduced compared to traditional all-metal shock absorbers.

Several windows 90 are positioned in the overlapping region 56 of the composite mounting attachment 26 where the outer surface of the metal damper tube 22 is left exposed and uncovered by the composite material 58 of the composite mounting attachment 26. The windows 90 promote heat dissipation away from the metal damper tube 22 while decreasing heat transmission from the metal damper tube 22 to the composite mounting attachment 26 to reduce overheating the composite material 58. This is important because overheating can reduce the structural integrity, durability, and service life of the composite material 58 of the composite mounting attachment 26 over time. For example, with glass-reinforced thermoplastics, mechanical property degradation can occur with sustained temperatures above 100-120° C., including increased ageing behaviour and accelerated fatigue. The metal damper tube 22 has a much higher thermal conductivity than the composite material 58 of the composite mounting attachment 26. The window(s) 90 in the overlapping region 56 of the composite mounting attachment 26 therefore help reduce the internal temperature of the shock absorber 20 during operation by providing a larger exposed surface area of the metal damper tube 22 to dissipate heat. More importantly, the structural integrity, durability, and strength of the composite material 58 of the mounting yoke can be compromised if the composite material 58 becomes overheated during operation of the shock absorber 20. So while the window(s) 90 in the overlapping region 56 of the composite mounting attachment 26 help reduce the operating temperature of the shock absorber 20, more importantly the window(s) 90 also reduce the amount of heat that is transmitted from the metal damper tube 22 to the composite mounting attachment 26 to reduce overheating of the composite material 58. Ultimately, this improves the durability and service life of the composite mounting attachment 26. Optionally, the composite mounting attachment 26 may also include a plurality of reinforcing ribs 92 that extend across the overlapping region 56, each of the first and second stanchions 60, 62, and/or the integral spring seat 28 for added rigidity/strength and reduced weight.

It should be appreciated that the teachings of the present disclosure may be applied to a variety of different shock absorber types/designs, including without limitation, to mono-tube shock absorbers, dual-tube (i.e., twin-tube) shock absorbers, and MacPherson struts. In a mono-tube shock absorber, the metal damper tube 22 may be, for example, a pressure tube of the shock absorber 20. In a dual-tube shock absorber, the metal damper tube 22 may be, for example, a reserve/reservoir tube of the shock absorber 20. Alternative, the metal damper tube 22 may be simply an outer housing of the shock absorber 20 or some combination thereof.

Figure 7:
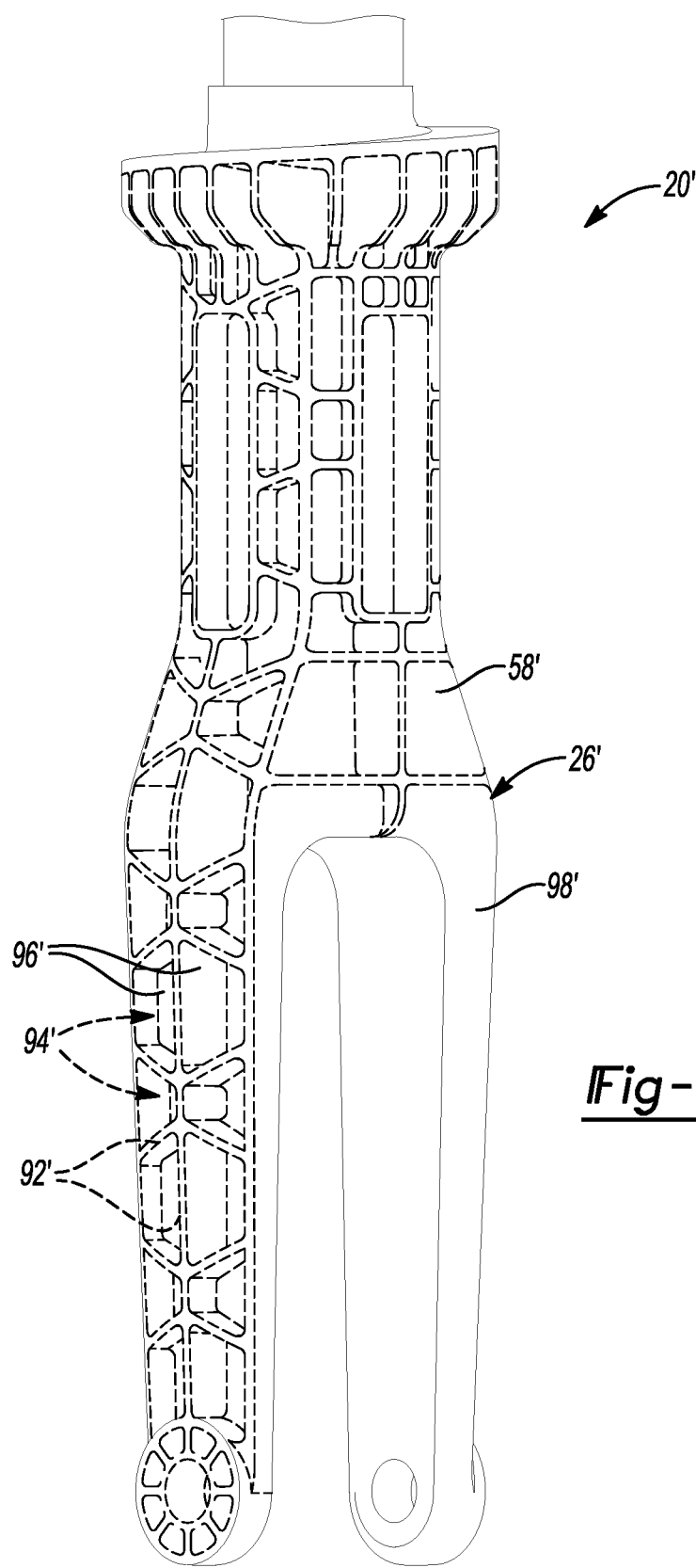
FIG. 7 is a side perspective view of another exemplary shock absorber that has been constructed according to the teachings of the present disclosure.

With reference to FIG. 7, another exemplary shock absorber 20' is illustrated. Many of the elements of the shock absorber 20' shown in FIG. 7 are the same as the elements of the shock absorber 20 shown in FIGS. 2-6 and therefore share the same reference numbers, except that the reference numbers identifying the elements of the shock absorber 20' shown in FIG. 7 have been appended with a prime (') annotation after the reference numeral.

As shown in FIGS. 2-6, the reinforcing ribs 92 create interstitial pockets 94 between adjacent reinforcing ribs 92. One disadvantage to this design is dust inclusion in the interstitial pockets 94 between the reinforcing ribs 92, which can build up with dust, dirt, mud, water, and/or snow. In FIG. 7, the interstitial pockets 94' are filled with a filler material 96' to give the composite mounting attachment 26' a smooth exterior 98', thereby solving this potential drawback at the cost of adding a small amount of weight, material cost, and manufacturing cost. To minimize these drawbacks, the composite material 58' forming the reinforcing ribs 92' has a first density that is selected for strength and durability and the filler material 96' is selected for lightness and has a second density that is less than the first density. By way of example and without limitation, the filler material 96' may include low density thermoplastics, foam, or a lattice structure with a smooth outer face.

Alternatively, the material and/or the shape of the metal insert 44 and the first and second legs 72, 74 might be optimized so that the reinforcing ribs 92 might be eliminated altogether, leading to a flat surface with a thickness acceptable for the processing. By way of example and without limitation, the metal insert 44 and the first and second legs 72, 74 might be optimized by selecting a material with a greater strength, thickness, and/or protrusions to locally reinforce the areas of the composite mounting attachment 26 where the reinforcing ribs 92 are being eliminated.

Many modifications and variations of the present disclosure are possible in light of the above teachings and may be practiced otherwise than as specifically described while within the scope of the appended claims.

What is claimed is:

1. A shock absorber comprising:
a metal damper tube extending co-axially about a longitudinal axis between a first damper tube end and a second damper tube end;
said metal damper tube including an internal surface and an external surface;
a base assembly, fixed to said metal damper tube, that includes a composite mounting attachment made of a composite material;
said composite mounting attachment extending between a proximal end and a distal end;
said proximal end including a cavity that houses at least a portion of said metal damper tube to define an overlapping region where said composite mounting attachment and said metal damper tube are co-extensive with each other; and
at least one window in said overlapping region of said composite mounting attachment, wherein said composite mounting attachment and said metal damper tube are in contact with each other except in a region of the at least one window where said metal damper tube is left exposed and uncovered by said composite material of said composite mounting attachment to promote heat dissipation away from said metal damper tube while reducing heat transmission from said metal damper tube to said composite mounting attachment.

2. The shock absorber as set forth in claim 1, wherein said composite mounting attachment includes a first stanchion and a second stanchion that extends longitudinally from said overlapping region of said composite mounting attachment to said distal end.

3. The shock absorber as set forth in claim 2, wherein said base assembly includes a metal insert that is embedded in said composite material forming said composite mounting attachment, said metal insert including first and second legs that extend longitudinally within said first and second stanchions, respectively, from a flange that is attached to said second end of said metal damper tube at a fixed flange connection.

4. The shock absorber as set forth in claim 3, wherein said base assembly includes first and second metal eyelets, wherein said first and second stanchions include first and second bores, respectively, that are positioned at said distal end of said composite mounting attachment and that cooperate to form a fastener bore that extends perpendicularly relative to said longitudinal axis, wherein said first and second legs include first and second holes, respectively, that are arranged in alignment with said first and second bores in said first and second stanchions, and wherein said first and second metal eyelets are positioned in and extend through said first and second bores in said first and second stanchions of said composite mounting attachment and said first and second holes in said first and second legs of said metal insert.

5. The shock absorber as set forth in claim 4, wherein said first and second metal eyelets are attached to said first and second legs of said metal insert at first and second fixed connections and wherein said first and second fixed connections and said fixed flange connection are press-fit or welded.

6. The shock absorber as set forth in claim 2, wherein said first and second stanchions extend parallel to each other on opposite sides of said longitudinal axis and are spaced apart by a transverse gap.

7. The shock absorber as set forth in claim 1, wherein said composite mounting attachment includes a plurality of reinforcing ribs that extend across at least said overlapping region to create interstitial pockets between adjacent reinforcing ribs.

8. The shock absorber as set forth in claim 7, wherein said interstitial pockets are filled with a filler material to give said composite mounting attachment a smooth exterior, said composite material having a first density, and said filler material having a second density that is less than said first density.

9. The shock absorber as set forth in claim 1, wherein said metal damper tube includes an internal surface and an external surface, said external surface of said metal damper tube including a textured area adjacent said second damper tube end, and said composite material of said composite mounting attachment is bonded to said textured area of said metal damper tube.

10. The shock absorber as set forth in claim 4, wherein said composite material of said composite mounting attachment is an overmolded composite material that covers at least portions of said metal damper tube, said metal insert, and said first and second metal eyelets.

11. The shock absorber as set forth in claim 1, wherein said proximal end of said composite mounting attachment includes an integral spring seat that extends radially outward away from said metal damper tube and is made of said composite material.

12. A shock absorber comprising:
a metal damper tube extending co-axially about a longitudinal axis between a first damper tube end and a second damper tube end;
said metal damper tube including an internal surface and an external surface;
a piston slideably disposed inside said metal damper tube;
a piston rod, fixably coupled to said piston, that extends co-axially along said longitudinal axis and protrudes out from said first damper tube end;
a base assembly that is fixed to said metal damper tube at a location adjacent said second damper tube end;
said base assembly including a composite mounting attachment that extends longitudinally between a proximal end and a distal end;
said proximal end of said composite mounting attachment including a cavity that houses at least a portion of said metal damper tube to define an overlapping region adjacent to said proximal end of said composite mounting attachment where said composite mounting attachment and said metal damper tube are co-extensive with each other;
said composite mounting attachment is made of a composite material that is bonded to said external surface of said metal damper tube; and at least one window in said overlapping region of said composite mounting attachment, wherein said composite mounting attachment and said metal damper tube are in contact with each other except in a region of the at least one window where said metal damper tube is left exposed and uncovered by said composite material of said composite mounting attachment to promote heat dissipation away from said metal damper tube while reducing heat transmission from said metal damper tube to said composite mounting attachment to reduce overheating said composite material.

13. The shock absorber as set forth in claim 12, wherein said composite mounting attachment includes a plurality of reinforcing ribs and interstitial pockets between adjacent reinforcing ribs.

14. The shock absorber as set forth in claim 13, wherein said interstitial pockets are filled with a filler material to give said composite mounting attachment a smooth exterior, said composite material having a first density, and said filler material having a second density that is less than said first density.

15. The shock absorber as set forth in claim 12, wherein said proximal end of said composite mounting attachment includes an integral spring seat that extends radially outward away from said metal damper tube and said distal end of said composite mounting attachment includes first and second stanchions that extend longitudinally from said overlapping region of said composite mounting attachment.

16. The shock absorber as set forth in claim 12, wherein said external surface of said metal damper tube including a textured area adjacent said second damper tube end and said composite material of said composite mounting attachment is bonded to said textured area of said metal damper tube.

17. The shock absorber as set forth in claim 12, wherein said composite material of said composite mounting attachment is a reinforced thermoplastic that is overmolded onto at least portions of said metal damper tube by an injection molding or three-dimensional printing process.

18. A shock absorber comprising:
a metal damper tube extending co-axially about a longitudinal axis between a first damper tube end and a second damper tube end;
a base assembly that is fixed to said metal damper tube at a location adjacent said second damper tube end;
said base assembly including a composite mounting attachment, made of a composite material, that extends longitudinally between a proximal end and a distal end;
said proximal end of said composite mounting attachment including a cavity that houses at least a portion of said metal damper tube to define an overlapping region adjacent to said proximal end of said composite mounting attachment where said composite mounting attachment and said metal damper tube are co-extensive with each other;
said composite mounting attachment including one or more windows, wherein said composite mounting attachment and said metal damper tube are in contact with each other except in a region of said one or more windows where said outer surface of said metal damper tube is left exposed and uncovered to promote heat dissipation away from said metal damper tube while decreasing heat transmission from said metal damper tube to said composite mounting attachment to reduce overheating said composite material;
said composite mounting attachment including a first stanchion and a second stanchion that extend longitudinally from said overlapping region of said composite mounting attachment to said distal end;
said first and second stanchions extending substantially parallel to each other on opposite sides of said longitudinal axis and being spaced apart by a transverse gap; and
said first and second stanchions including first and second bores, respectively, that are positioned at said distal end of said composite mounting attachment and that cooperate to form a fastener bore that extends perpendicularly relative to said longitudinal axis.

19. The shock absorber as set forth in claim 18, wherein said base assembly includes a metal insert that is embedded in said composite material forming said composite mounting attachment, said metal insert including first and second legs that extend longitudinally within said first and second stanchions, respectively, from a flange that is attached to said second end of said metal damper tube at a fixed flange connection.

20. The shock absorber as set forth in claim 19, wherein said base assembly includes first and second metal eyelets, wherein said first and second stanchions include first and second bores, respectively, that are positioned at said distal end of said composite mounting attachment and that cooperate to form a fastener bore that extends perpendicularly relative to said longitudinal axis, wherein said first and second legs include first and second holes, respectively, that are arranged in alignment with said first and second bores in said first and second stanchions, and wherein said first and second metal eyelets are positioned in and extend through said first and second bores in said first and second stanchions of said composite mounting attachment and said first and second holes in said first and second legs of said metal insert.

* * * * *